US006828559B2

(12) United States Patent
Griffin et al.

(10) Patent No.: US 6,828,559 B2
(45) Date of Patent: Dec. 7, 2004

(54) SENSOR HAVING A PLURALITY OF ACTIVE AREAS

(75) Inventors: Dennis P. Griffin, Noblesville, IN (US); William W. Fultz, Carmel, IN (US); Cunkai Wu, Sterling Heights, MI (US)

(73) Assignee: Delphi Technologies, Inc, Troy, MI (US)

( * ) Notice: Subject to any disclaimer, the term of this patent is extended or adjusted under 35 U.S.C. 154(b) by 12 days.

(21) Appl. No.: 10/294,492

(22) Filed: Nov. 14, 2002

(65) Prior Publication Data

US 2004/0094717 A1 May 20, 2004

(51) Int. Cl.[7] .................................................. G01B 7/03
(52) U.S. Cl. ........................................ 250/349; 356/446
(58) Field of Search ............................ 250/349, 370.01, 250/370.13, 206.1, 206.2, 214.1; 356/446; 348/332, 294

(56) References Cited

U.S. PATENT DOCUMENTS 4,576,481 A * 3/1986 Hansen ....................... 356/620
4,649,504 A * 3/1987 Krouglicof et al. ......... 702/153
5,330,226 A 7/1994 Gentry et al. ............... 280/735
5,541,652 A * 7/1996 Jackson et al. ............. 348/332
5,785,347 A 7/1998 Adolph et al. .............. 280/735
6,013,986 A * 1/2000 Knall et al. .............. 315/169.3
6,326,782 B1 12/2001 Schroeder
6,564,125 B2 5/2003 Pattok et al.

OTHER PUBLICATIONS http://usa/hamamatsu.com/hcpdf/s8301.pdf, Hamamatsu Photonics K.K., Solid State Division, Cat. No. KPSD1016E01, Jan. 2001, pp. 1–2.

* cited by examiner

*Primary Examiner*—Constantine Hannaher
*Assistant Examiner*—Otilia Gabor
(74) *Attorney, Agent, or Firm*—Stefan V Chmielewski

(57) ABSTRACT

A sensor including at least two active areas for receiving light energy and a resistive layer disposed on each of the at least two active areas for providing a pair of current signals corresponding to a position of light energy of a predetermined wavelength striking the active area. The two or more active areas are electrically isolated from each other and operate independent of each other. Preferably, the two or more active areas are electrically isolated with silicon dioxide.

10 Claims, 5 Drawing Sheets

SENSOR HAVING A PLURALITY OF ACTIVE AREAS

FIELD OF THE INVENTION

The present invention relates to sensors and, more particularly, to sensors for position detection systems.

BACKGROUND OF THE INVENTION

Vehicle occupant position detection systems are useful in connection with air bags and other pyrotechnically deployed restraints as a means of determining when, and with what force, a restraint should be deployed. In general, such systems include an emitter for emitting one of more beams of infrared energy (wavelengths between 700 nanometers and 1100 nanometers) to define a corresponding number of viewing fields and a receiver having a sensor for receiving the reflected energy to detect the presence of an occupant or target within the viewing fields. The sensor converts the focused light energy reflected from the target into position relative, electrical sensor currents. The sensor currents are used by the vehicle occupant position detection system to determine the distance of the target from the system.

The prior art sensor includes a single 10 millimeter by 10 millimeter active area for receiving the reflected light energy. Further, the prior art sensor requires an optical separation between the emitter and the receiver approximately equal to or greater than 70 millimeters. As a result, the system, including the emitter and receiver, has a relatively large package size. Attempts to decrease the package size by shortening the optical separation between the transmitter and the receiver result in reduced sensor resolution. Accordingly, it would be desirable to provide a sensor for a position detection system having greater resolution and a smaller package size.

SUMMARY OF THE INVENTION

The present invention provides a sensor including at least two active areas for receiving light energy and a resistive layer disposed on each of the at least two active areas for providing a pair of current signals corresponding to a position of light energy of a predetermined wavelength striking the active area.

The two or more active areas are electrically isolated from each other and operate independent of each other. Preferably, the two or more active areas are electrically isolated with silicon dioxide.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 2:
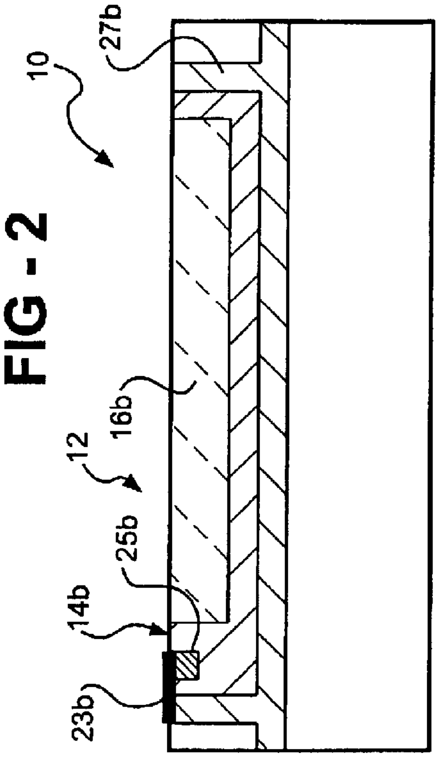
FIG. 2 is a cross-sectional view of the sensor taken along lines 2—2 in FIG. 1.
Figure 1:
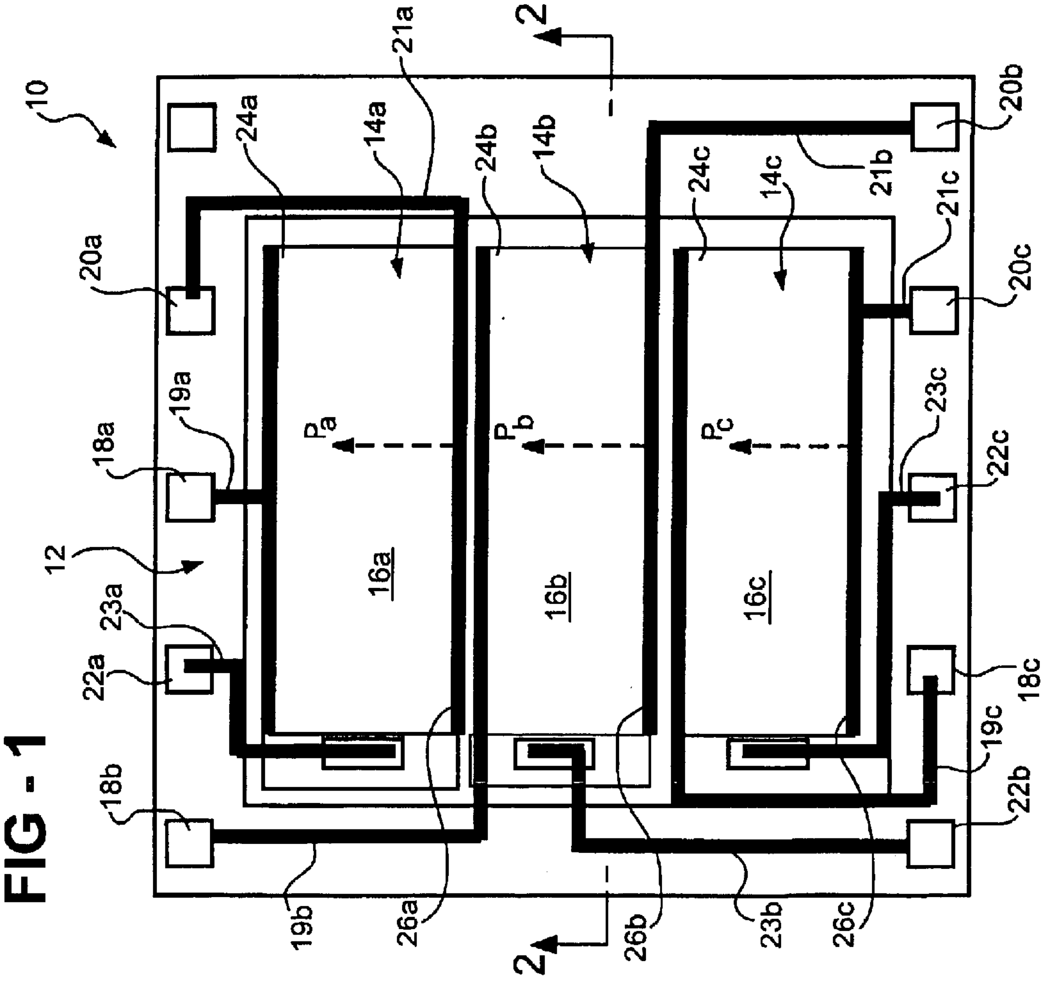
FIG. 1 is a front view of a sensor having a plurality of active areas in accordance with the present invention.

FIGS. 1 and 2 illustrate a sensor 10 in accordance with the present invention. The sensor 10 includes a surface 12 having a plurality of active areas 14*a*, 14*b*, and 14*c* for receiving light energy. In FIG. 1, the sensor 10 is illustrated as including three co-planar active areas 14*a*, 14*b*, and 14*c*. A resistive layer 16*a*, 16*b*, and 16*c* is disposed on each active area 14*a*, 14*b*, and 14*c* respectively for providing a pair of current signals corresponding to a position of light energy of a predetermined wavelength striking the respective active area 14*a*, 14*b*, or 14*c*. The sensor 10 is often referred to in the art as a Position Sensitive Detector (PSD).

Each active area 14*a*, 14*b*, and 14*c* is a two-dimensional element having a positional axis, designated as Pa, Pb, and Pc in FIG. 1. Each active area 14*a*, 14*b*, and 14*c* includes a first anode 18*a*, 18*b*, and 18*c* in electrical connection via a first metal contact 19*a*, 19*b*, and 19*c* with one edge or the top edge of the respective active area 24*a*, 24*b*, and 24*c*, a second anode 20*a*, 20*b*, and 20*c* in electrical connection with a second metal contact 21*a*, 21*b*, and 21*c* with an opposite edge or the bottom edge of the respective active area 26*a*, 26*b*, and 26*c*, and a cathode 22*a*, 22*b*, and 22*c* in electrical connection via a third metal contact 23*a*, 23*b*, and 23*c* with the respective active area 14*a*, 14*b*, and 14*c*. As shown in FIG. 2, an ohmic contact 25*b* provides an electrical connection between the second metal contact 23*b* and the active area 14*b*. Each active area 14*a*, 14*b*, and 14*c* is reverse biased with voltage across the first and second anodes 18*a*, 18*b*, and 18*c* and 20*a*, 20*b*, and 20*c* and the cathode 22*a*, 22*b* and 22*c* to establish photoconductive properties.

When light energy of the predetermined wavelength, preferably infrared light having a wavelength between 700 nanometers and 1100 nanometers, strikes or impinges the resistive layer 16*a*, 16*b*, or 16*a* of an active area 14*a*, 14*b*, 14*c*, the photoconductive properties of the respective area 14*a*, 14*b*, or 14*c* produce a pair of positional current signals or, in other words, position relative, electrical currents. One of the positional current signals, referred to as $i_y$ or $i_{TOP}$, has a current magnitude which corresponds to the position or distance along the positional axis Pa, Pb, or Pc of such impinging light energy relative to the top edge 24*a*, 24*b*, or 24*c* of the respective active area 14*a*, 14*b*, or 14*c*. The other of the positional current signals, referred to as $i_x$ or $i_{BOTTOM}$, has a current magnitude which corresponds to the position or distance along the positional axis Pa, Pb, or Pc of such impinging light energy relative to the bottom edge 26a, 26*b*, or 26*c* of the respective active area 14*a*, 14*b*, or 14*c*. The top current signal, $i_{TOP}$, is transmitted to the first anode 18*a*, 18*b*, or 18*c*. The bottom current signal, $i_{BOTTOM}$, is transmitted to the second anode 20*a*, 20*b*, or 20*c*.

Each active area 14*a*, 14*b*, and 14*c* is electrically isolated from each other with an isolating layer. The isolating layer 27*b* for the second active area 14*b* is illustrated in FIG. 2. Preferably, the isolating layer is formed from silicon dioxide. The electrical isolation enables each active area 14*a*, 14*b*, and 14*c* to operate independent of the other active areas. In other words, a first pair of positional current signals is produced when light energy of the predetermined wavelength strikes the first active area 14*a*, a second pair of positional current signals is produced when light energy of the predetermined wavelength strikes the second active area 14*b*, and a third pair of positional current signals is produced when light energy of the predetermined wavelength strikes the third active area 14*c*. Further, the active areas 14*a*, 14*b*, and 14*c* may be operated simultaneously to produce pairs of positional current signals in response to impinging light energy. The resistance across the resistive layers 16*a*, 16*b*, and 16*c* may be linear, logarithmic, or any other gradiently distributed function.

The sensor 10 can be used in a variety of position detection systems or, in other words, systems used either to detect a target/object or determine the distance between two targets/objects. However, the sensor 10 provides particular advantages when used in a vehicle occupant position detection system by facilitating the dynamic or real-time measurement of a distance between an occupant and an air bag door. Accordingly, further description of the sensor 10 and the operation thereof is provided below in reference to a vehicle occupant position detection system. Although the vehicle occupant position detection system described below determines a distance between a front seat passenger side occupant and an air bag door, the sensor 10 can also be used in a detection system which determines the distance between a driver and an air bag or rear seat passenger and an air bag.

Figure 3:
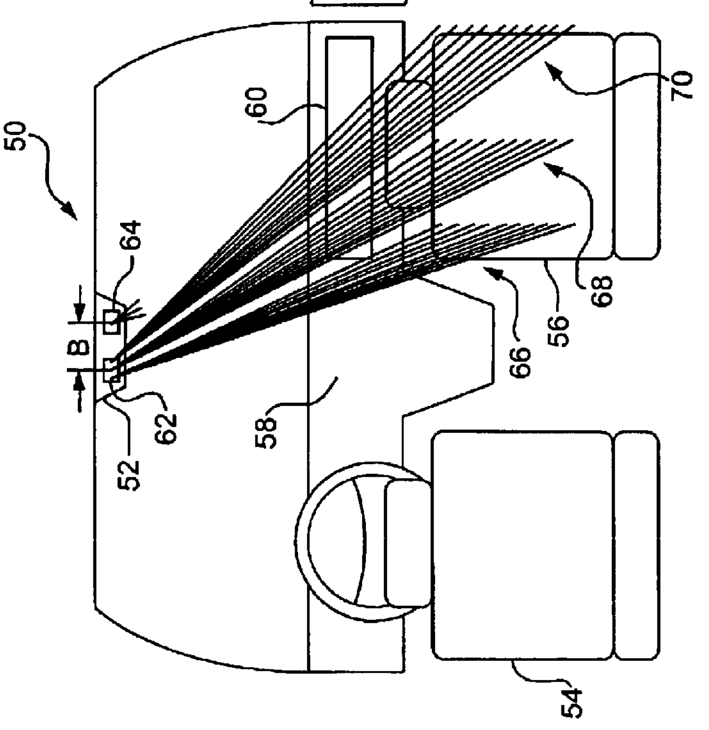
FIG. 3 is a diagram illustrating a portion of a passenger compartment of a motor vehicle equipped with an inflatable restraint and a vehicle occupant position detection system.

FIG. 3 is a diagram illustrating a portion of a passenger compartment of a motor vehicle equipped with an inflatable restraint and a vehicle occupant position detection system 50. In the illustrated embodiment, the system 50 is mechanized as a single module, mounted in a ceiling console 52 between and above the driver and passenger seats 54 and 56. Other locations for the system 50 are possible, however the illustrated location is generally preferred as it is least intrusive, easy to package, and centrally located for flexibility in sensing one or more of several occupant positions, if desired. The vehicle can have a bench seat instead of the illustrated bucket seats 54 and 56. Normal occupant positions on the seat(s) are defined by the placement of the seat belts (not shown).

In general, the system 50 is described in the context of a conventional supplemental inflatable restraint system, including an air bag 60 installed in an instrument panel 58 forward of the passenger seat 56. The system 50 interacts with the restraint system by scanning the vicinity of the seat 56 where an occupant might be positioned, and producing a control signal to either inhibit or allow deployment of the air bag 60 in response to a crash event of sufficient severity, based on the occupant classification, and/or the position of a recognized occupant relative to the air bag 60.

The vehicle occupant position detection system 50 includes a two-dimensional IR (infrared) LED (light emitting diode) emitter 62 that is selectively activated to periodically illuminate multiple predetermined viewing planes formed from a plurality of viewing points in the vicinity of passenger seat 56, as shown in FIG. 3. Individual LEDs of the emitter 62 are selectively activated to produce an IR beam whose direction is determined by the position of the LED in the array and the optical parameters of a lens system incorporated within the emitter 62. The constituent LEDs are arranged in a rectangular grid, three columns in width and ten rows in length. The emitter 62 is positioned in the ceiling console 52 such that the IR beams emitted by the LEDs in the first, second, and third columns of the emitter 62 are respectively directed along first, second, and third planes identified generally by the reference numerals 66, 68, and 70 in FIG. 3. The first plane 66 impinges on the normal orientation of an occupant's left leg and torso when normally seated, the second plane 68 impinges on the normal orientation of the occupant's right leg and torso, and the third plane 70 impinges on an interior edge of the passenger door 72. In each plane, some of the beams are directed through an out-of-position zone forward of the seat 56 and in proximity to the air bag 60, some are directed onto the seat 56 or door 72, and some are directed above the seat 56 and/or door 72. The IR energy reflected by the occupant or seat 56 or door 72 is detected by a photo-sensitive receiver 64, including the sensor 10 as described above, when the receiver 64 is disposed a predetermined distance B from the emitter 62. More specifically, the system 50 has been tested and the results indicate that when the receiver 64, including the sensor 10 having three active areas 14*a*, 14*b*, and 14*c*, is spaced from the emitter 62 by a distance approximately equal to or less than 45 millimeters with the sensor surface 12 facing the instrument panel 58 and oriented such that the top edge of the surface 12, denoted by anodes 18*a*, 18*b*, and 20*a*, is closest the passenger door 72, IR beams directed along the first plane 66 and reflected off the occupant or seat 56 impinging the first active area 14*a*, IR beams directed along the second plane 68 and reflected off the occupant or seat 56 impinge the second active area 14*b*, and IR beams directed along the third plane 70 and reflected off the occupant or seat 56 or door 72 impinge the third active area 14*c*.

Figure 4:
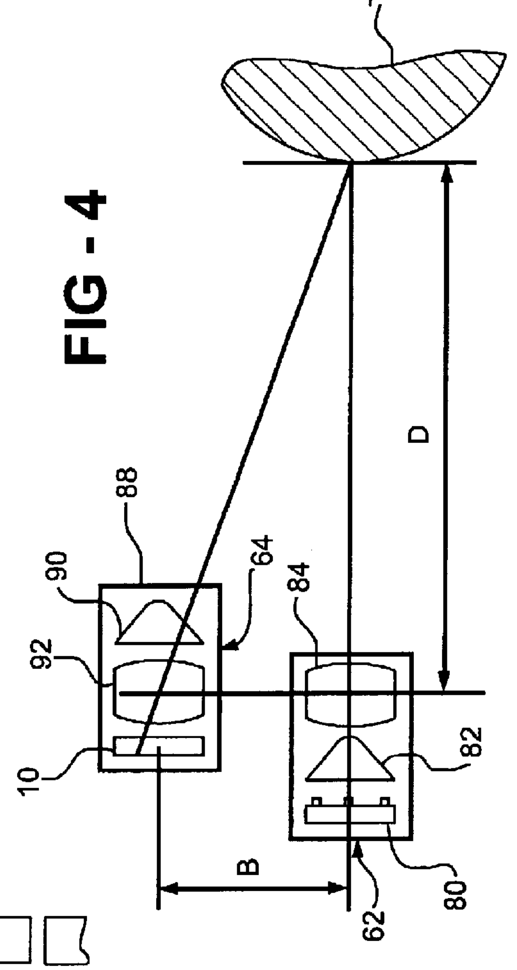
FIG. 4 is a diagram illustrating an emitter and a receiver, including the sensor of the present invention, of the vehicle occupant position detection system.

FIG. 4 is a diagram illustrating the emitter 62 and the receiver 64 of the vehicle occupant position detection system 50. The emitter 62 includes the IR LED array 80 and a lens system having an aspheric element 82 for concentrating IR light emitted from the array 80, and a symmetrical convex lens 84 for focusing the light on a target T, which in the illustrated embodiment, represents the passenger seat 56 or an occupant thereof. As described above, the array 80 includes a two-dimensional arrangement of selectively activated IR LEDs. The receiver 64 includes the sensor 10 and a lens system comprising an IR filter 88 for filtering out non-IR light or, in other words, passing only IR light, an aspheric element 90 for imaging the received IR light, and a symmetrical convex lens 92 for focusing the imaged light on the sensor 10.

As described above, the sensor 10 provides a pair of positional current signals, $i_{TOP}$ and $i_{BOTTOM}$, when IR light reflected off the target T impinges or strikes one of the active areas 14*a*, 14*b*, or 14*c* of the sensor 10. The distance D between the target T and the emitter 62 can be determined by calculating a response value R (where $R=i_{TOP}-i_{BOTTOM}/i_{TOP}+i_{BOTTOM}$) and cross-referencing the response value to response/target distance curves stored in a look-up table in memory.

Figure 5:
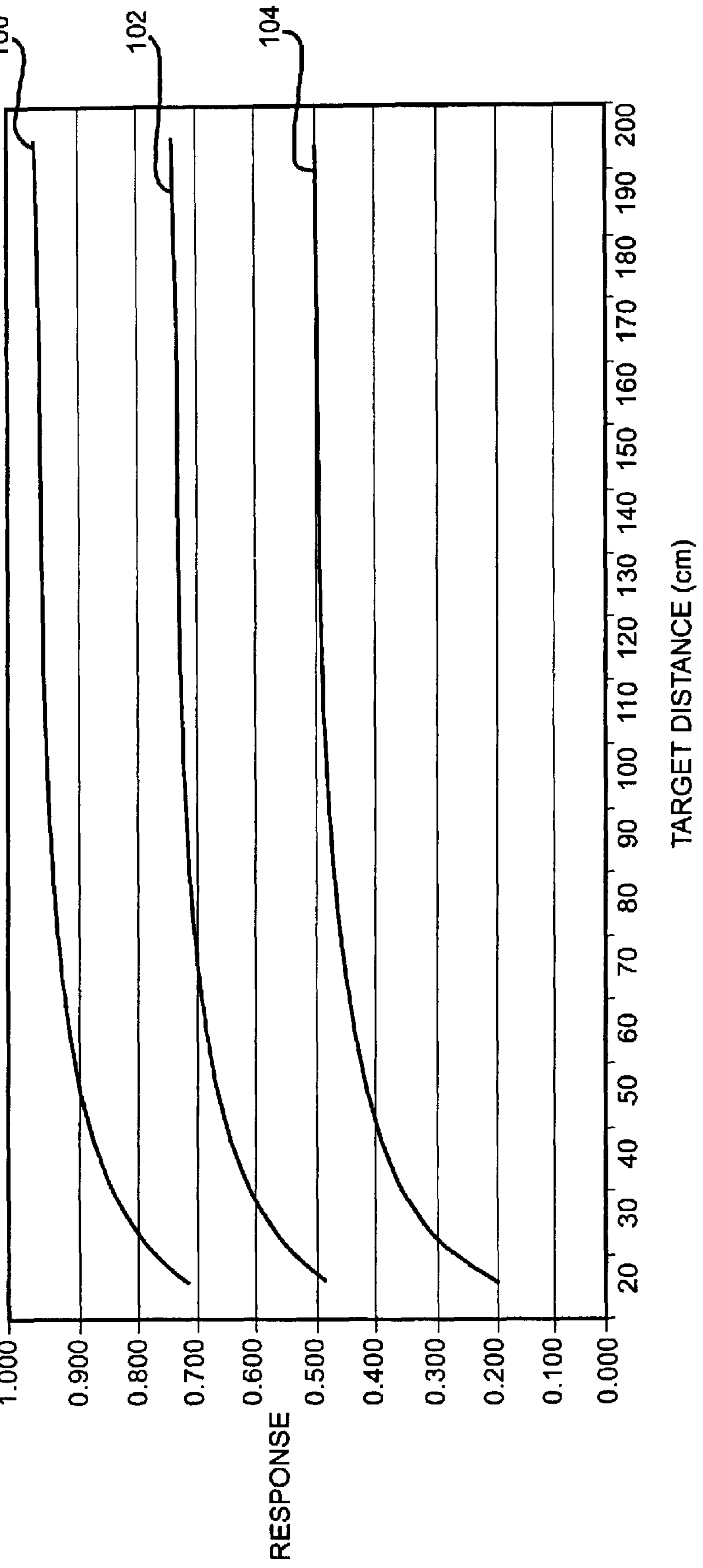
FIG - 5 PRIOR ART
FIG. 5 is a graph of response/target distance curves for prior art vehicle occupant position detection systems.

FIG. 5 is a graph of response/target distance curves for prior art vehicle occupant position detection systems having (1) a sensor including a single active area, and (2) an emitter to receiver distance of 70 millimeters. Target distances D can be determined by cross-referencing a calculated response value R from a known viewing plane to the respective curve. The first curve 100 is used for IR beams directed along the first plane 66 and reflected off the occupant or seat 56. The second curve 102 is used for IR beams directed along the second plane 68 and reflected off the occupant or seat 56. The third curve is used for IR beams directed along the third plane 70 and reflected off the occupant or seat 56 or door 72.

Figure 6:
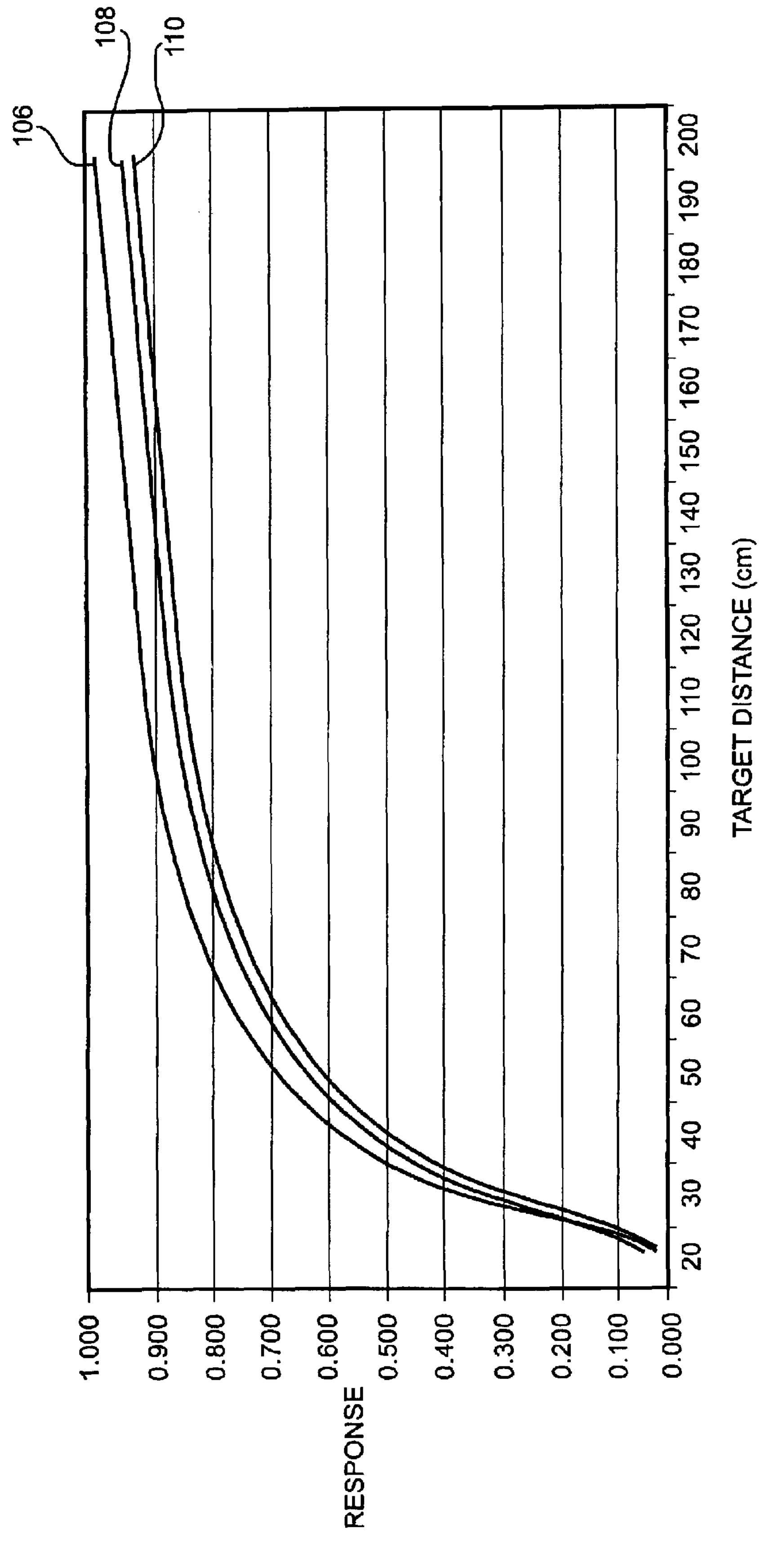
FIG. 6 is a graph of response/target distance curves for the sensor having a linear resistive layer.

FIG. 6 is a graph of response/target distance curves for the present invention wherein the emitter to receiver distance is 45 millimeters and the sensor includes three active areas 14*a*, 14*b*, and 14*c*, with each active area 14*a*, 14*b*, and 14*c* including a resistive layer 16*a*, 16*b*, and 16*c* having a linear resistance. Target distances D can be determined by cross-referencing a calculated response value R from a known viewing plane to the respective curve. The first curve 106 is used for IR beams directed along the first plane 66 and reflected off the occupant or seat 56 to the first active area 14*a*. The second curve 108 is used for IR beams directed along the second plane 68 and reflected off the occupant or seat 56 to the second active area 14*b*. The third curve 110 is used for IR beams directed along the third plane 70 and reflected off the occupant or seat 56 or door 72 to the third active area 14*c*.

Figure 7:
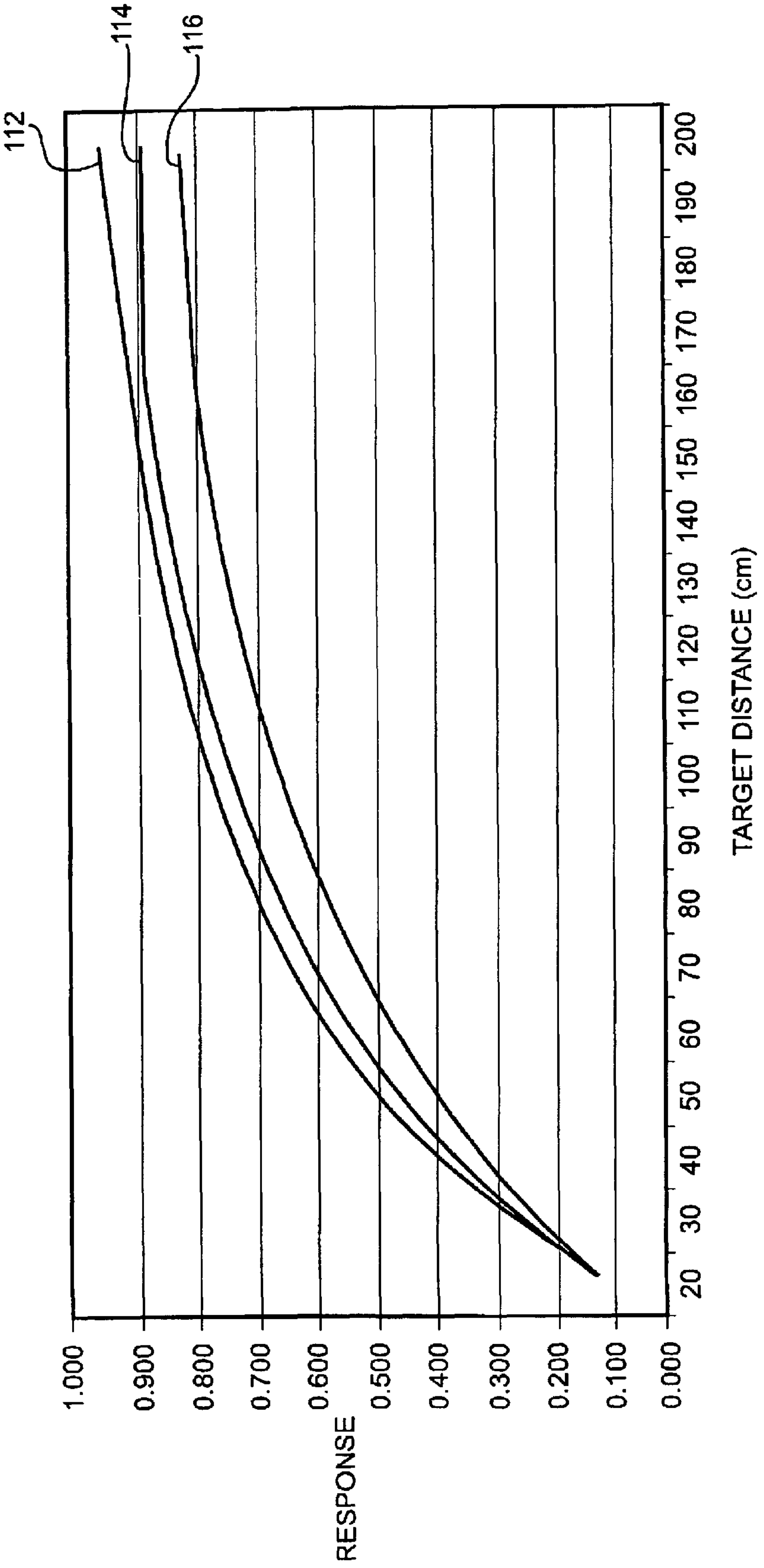
FIG. 7 is a graph of response/target distance curves for the sensor having a logarithmic resistive layer.

FIG. 7 is a graph of response/target distance curves for the present invention wherein the emitter to receiver distance is 45 millimeters and the sensor includes three active areas 14*a*, 14*b*, and 14*c*, each active area 14*a*, 14*b*, and 14*c* including a resistive layer 16*a*, 16*b*, and 16*c* having a logarithmic resistance. Target distances D can be determined by cross-referencing a calculated response value R from a known viewing plane to the respective curve. The first curve 112 is used for IR beams directed along the first plane 66 and reflected off the occupant or seat 56 to the first active area 14*a*. The second curve 114 is used for IR beams directed along the second plane 68 and reflected off the occupant or seat 56 to the second active area 14*b*. The third curve 116 is used for IR beams directed along the third plane 70 and reflected off the occupant or seat 56 or door 72 to the third active area 14*c*.

The resolution of a sensor is dependent on or a function of the magnitude of the slope of the response/target distance curves. Comparing the present invention and the prior art, the response/target distance curves of the present invention sensor 10, illustrated in FIGS. 6 and 7, have a greater magnitude of slope or rate of change than the response/target distance curves of the prior art sensor, illustrated in FIG. 5, and, thus, provide greater sensor resolution. Comparing logarithmic resistance to linear resistance, the response/target distance curves of the sensor 10 including logarithmic resistive layers, as illustrated in FIG. 7, have a more linear slope than the response/target distance curves of the sensor 10 including linear resistive layers, illustrated in FIG. 6, and, thus, provide greater sensor resolution.

In summary, the present invention provides a sensor for a position detection system having greater resolution and a smaller package size than the prior art.

What is claimed is:

1. An emitter and receiver system for sensing a distance between the emitter and a target, the system comprising:

the emitter comprising at least a first column of light emitting sources and a second column of light emitting sources, each source being adapted for emitting light; and the receiver including a sensor having at least a first active area and a second active area and a resistive layer disposed on each of the at least two active areas for providing a pair of current signals corresponding to a position of light striking the active areas, and a singular lens arranged relative to the receiver for focusing light that is reflected off the target from the first column of light emitting sources onto the first active area, and for focusing light reflected off the target from the second column of light emitting sources onto the second active area.

2. The system of claim 1 wherein the first and second active areas operate independent of each other.

3. The system of claim 1 wherein the first and second active areas are electrically isolated from each other.

4. The system of claim 3 wherein each active area is electrically isolated with silicon dioxide.

5. The system of claim 1 wherein light energy source emits light to illuminate a viewing point for each of the first and second active areas.

6. The system of claim 5 wherein the first active area provides a first pair of positional current signals in response to light from a first viewing point reflecting off the target and striking the first active area and the second active area provides a second pair of positional current signals in response to light from a second viewing point reflecting off the target and striking the second active area.

7. The system of claim 1 wherein the emitter further includes a lens system having an aspheric element for concentrating light emitted from the light energy source and a symmetrical convex lens for focusing the concentrated light energy on the target.

8. The system of claim 1 wherein the light energy source is an infrared light emitting diode array for emitting infrared light to illuminate a viewing plane for each of the first and second active areas.

9. The system of claim 8 wherein the receiver further includes an infrared filter for passing only infrared light and an aspheric element for imaging the filtered infrared light, and further wherein the singular lens is a symmetrical convex lens for focusing the imaged infrared light on the first and second active areas.

10. The system of claim 1 wherein the receiver is disposed approximately 45 millimeters from the emitter.

* * * * *